United States Patent
Oda

(10) Patent No.: US 9,485,498 B2
(45) Date of Patent: Nov. 1, 2016

(54) DISPLAY APPARATUS, PROJECTION APPARATUS, DISPLAY ASSIST APPARATUS, AND SYSTEM

(71) Applicant: CASIO COMPUTER CO., LTD., Shibuya-ku, Tokyo (JP)

(72) Inventor: Kiyoshi Oda, Hino (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 302 days.

(21) Appl. No.: 14/031,984

(22) Filed: Sep. 19, 2013

(65) Prior Publication Data
US 2014/0078271 A1 Mar. 20, 2014

(30) Foreign Application Priority Data

Sep. 20, 2012 (JP) ................................. 2012-207224
Jun. 14, 2013 (JP) ................................. 2013-125634

(51) Int. Cl.
*H04N 13/04* (2006.01)
*H04N 9/31* (2006.01)

(52) U.S. Cl.
CPC ........ *H04N 13/0438* (2013.01); *H04N 9/3111* (2013.01); *H04N 13/0459* (2013.01); *H04N 13/0497* (2013.01)

(58) Field of Classification Search
None
See application file for complete search history.

(56) References Cited

U.S. PATENT DOCUMENTS

| 8,371,702 B2 | 2/2013 | Macpherson | |
| 2007/0046776 A1* | 3/2007 | Yamaguchi | H04N 13/0059 348/53 |
| 2010/0177171 A1* | 7/2010 | Marcus | G02B 27/2264 348/53 |
| 2012/0038758 A1* | 2/2012 | Khassanov | G09G 3/20 348/60 |
| 2012/0044333 A1* | 2/2012 | Kang | H04N 13/0438 348/56 |
| 2012/0056876 A1* | 3/2012 | Lee | H04N 13/0434 345/419 |
| 2012/0120067 A1* | 5/2012 | Kim | G02B 27/2264 345/419 |
| 2012/0120190 A1* | 5/2012 | Lee | H04N 13/0029 348/43 |
| 2012/0182405 A1* | 7/2012 | Huang | H04N 13/0497 348/54 |
| 2012/0182613 A1* | 7/2012 | Yoneno | G02B 27/2264 359/465 |
| 2012/0194657 A1* | 8/2012 | Ko | G02B 27/2264 348/56 |
| 2012/0218383 A1* | 8/2012 | Shiki | H04N 13/0055 348/43 |

FOREIGN PATENT DOCUMENTS

JP 2011-70193 A 4/2011

* cited by examiner

*Primary Examiner* — Reza Aghevli
(74) *Attorney, Agent, or Firm* — Holtz, Holtz & Volek PC

(57) ABSTRACT

A display apparatus includes a master/slave setting unit configured to execute at least one of setting of a master apparatus which displays a switching-display synchronization signal superposed on an image as a target to be displayed and setting of a slave apparatus which does not display the switching-display synchronization signal, a synchronization-signal superposition unit configured to superpose the switching-display synchronization signal on the image as the target to be displayed, when setting of the master apparatus is executed by the master/slave setting unit, and a display unit configured to display the image on which the switching-display synchronization signal is superposed by the synchronization signal superposition unit.

19 Claims, 10 Drawing Sheets

DISPLAY APPARATUS, PROJECTION APPARATUS, DISPLAY ASSIST APPARATUS, AND SYSTEM

CROSS-REFERENCE TO RELATED APPLICATIONS

This application is based upon and claims the benefit of priority from prior Japanese Patent Applications No. 2012-207224, filed Sep. 20, 2012; and No. 2013-125634, filed Jun. 14, 2013, the entire contents of all of which are incorporated herein by reference.

BACKGROUND OF THE INVENTION

1. Field of the Invention

The present invention relates to a display apparatus, a projection apparatus, display assist apparatus, and a system, which are particularly suitable for a DLP (registered trademark) projector.

2. Description of the Related Art

For Digital Light Processing (DLP [registered trademark]) projectors, there is a known technology of projecting 3D (stereoscopic) images together with a synchronization pulse to be visually recognized (For example, Japan Jpn. Pat. Appln. KOKAI Publication No. 2011-070193).

Now, a case is supposed that a plurality of projection apparatuses each of which displays left- and right-eye images switched alternately are operated in parallel to project the images onto multiple screens, which are watched through 3D eyewear.

In this case, the projection apparatuses are asynchronous with each other, and each of the apparatuses sends a control signal to control a shutter operation for a left-eye lens and a right-eye lens of the 3D eyewear.

Therefore, a 3D image cannot normally be visually recognized with one 3D eyewear unit.

Under the circumstances, it is desired to provide a display apparatus, a projection apparatus, a display assist apparatus, and a system, which allow associated left- and right-eye images to be steadily watched even with one view eyewear (display assist apparatus) when a plurality of display apparatuses each of which displays left eye images and right eye images switched alternately are operated in parallel.

BRIEF SUMMARY OF THE INVENTION

According to one aspect of the present invention, there is provided a display apparatus having a switching-display function to switch and display left- and right-eye images, comprising: a master/slave setting unit configured to execute at least one of setting of a master apparatus which displays a switching-display synchronization signal superposed on an image as a target to be displayed and setting of a slave apparatus which does not display the switching-display synchronization signal; a synchronization-signal superposition unit configured to superpose the switching-display synchronization signal on the image as the target to be displayed, when setting of the master apparatus is executed by the master/slave setting unit; and a display unit configured to display the image on which the switching-display synchronization signal is superposed by the synchronization signal superposition unit.

According to another aspect of the present invention, there is provided a projection apparatus comprising: a display apparatus having a switching-display function to switch and display left- and right-eye images, comprising a master/slave setting unit configured to execute at least one of setting of a master apparatus which displays a switching-display synchronization signal superposed on an image as a target to be displayed and setting of a slave apparatus which does not display the switching-display synchronization signal; a synchronization signal superposition unit configured to superpose the switching-display synchronization signal onto the image as the target to be displayed, when setting of the master apparatus is executed by the master/slave setting unit, and a display unit configured to display the image on which the switching-display synchronization signal is superposed by the synchronization signal superposition unit; and a projection unit configured to form and emit an optical image from the image displayed by the display unit.

According to still another aspect of the present invention, there is provided a display assist apparatus configured to cooperate with a display apparatus having a switching-display function to switch and display left- and right-eye images, comprising: a light sensing unit configured to receive display light from a target to be displayed; a distinguishing unit configured to determine whether the display light received by the light sensing unit includes a switching-display synchronization signal or not; and a switch control unit configured to perform a switch shutter operation for images to be switched and displayed, based on the synchronization signal, when the switching-display synchronization signal is determined to be included by the distinguishing unit.

According to further aspect of the present invention, there is provided a system comprising: a display apparatus having a switching-display function to switch and display left- and right-eye images; and a display assist apparatus configured to cooperate with the display apparatus, the display apparatus comprising: a master/slave setting unit configured to execute at least one of setting of a master apparatus which displays a switching-display synchronization signal superposed on an image as a target to be displayed and setting of a slave apparatus which does not display the switching-display synchronization signal, a synchronization signal superposition unit configured to superpose the switching-display synchronization signal on the image as the target to be displayed, when setting of the master apparatus is executed by the master/slave setting unit, and a display unit configured to display the image on which the switching-display synchronization signal is superposed by the synchronization signal superposition unit, the display assist apparatus comprising: a light sensing unit configured to receive a display control signal superposed on the image as the target to be displayed, a distinguishing unit configured to determine whether the display control signal received by the light sensing unit is a switching-display synchronization signal or not, and a switch control unit configured to perform a switch shutter operation for images switched and displayed, based on the switching-display synchronization signal determined by the distinguishing unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodi

DETAILED DESCRIPTION OF THE INVENTION

An embodiment will now be described with reference to the drawings where the invention is applied to a DLP (registered trademark) projector apparatus.

Figure 1:
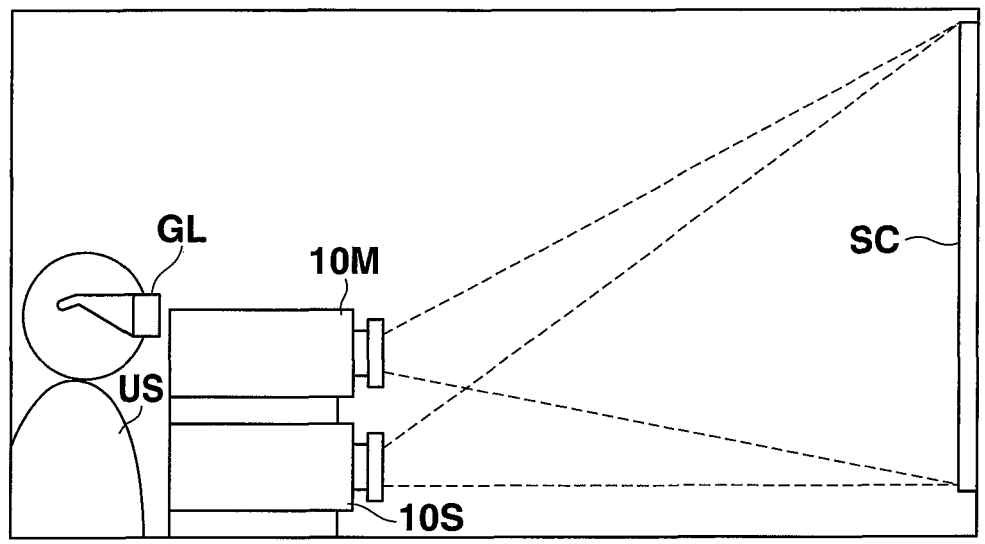
- FIG. 1 shows an example of a projection environment of a projector system according to an embodiment of the invention.

FIG. 1 shows an environment of a projection system which includes a projector apparatus 10M and a projector apparatus 10S according to the embodiment.

As shown in the figure, the two projector apparatuses 10M and 10S are set stacked on one another. A user US who wears 3D liquid-crystal eyewear GL watches images which are projected overlapped on one another to a screen SC from projector apparatuses 10M and 10S, respectively.

For example, settings have been executed by unillustrated manual switches or a remote controller in a manner that projector apparatus 10M positioned in the upper side serves as a master and projector apparatus 10S positioned in the lower side serves as a slave.

Figure 2:
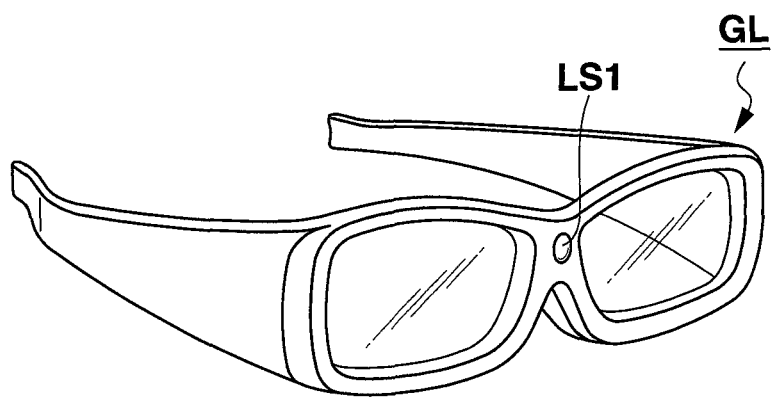
FIG. 2 is a perspective view showing an exterior configuration of 3D liquid-crystal eyewear according to the embodiment.

FIG. 2 is a perspective view showing an exterior configuration of the 3D liquid-crystal eyewear GL.

The 3D liquid-crystal eyewear GL is a pair of overglasses which can be wore over ordinary glasses even when the user US wears a pair of ordinary glasses. A light sensor LS1 is provided in the front side of a bridging part in the center of the eyewear.

The light sensor LS1 detects changes in luminous intensity on the surface of the screen SC when the light sensor LS1 is oriented toward the screen SC.

The user US can watch a stereoscopic image in a manner that left and right lenses each made of a phototransmissive monochrome liquid-crystal panel are alternately made photo-obstructive and phototransmissive, synchronized with a synchronization signal which is received by the light sensor LS1 and is superposed on the projected images.

Figure 3A:
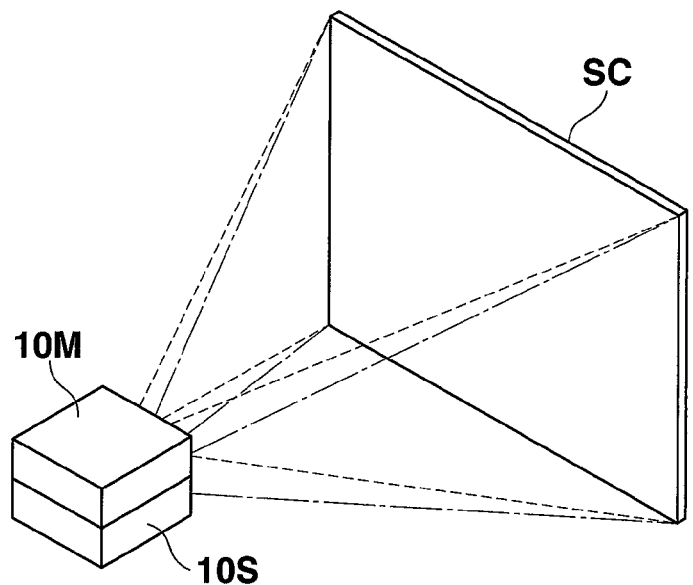
FIG. 3A shows a projection environment in which overlapped projection is performed in the projector system according to the embodiment.
Figure 3B:
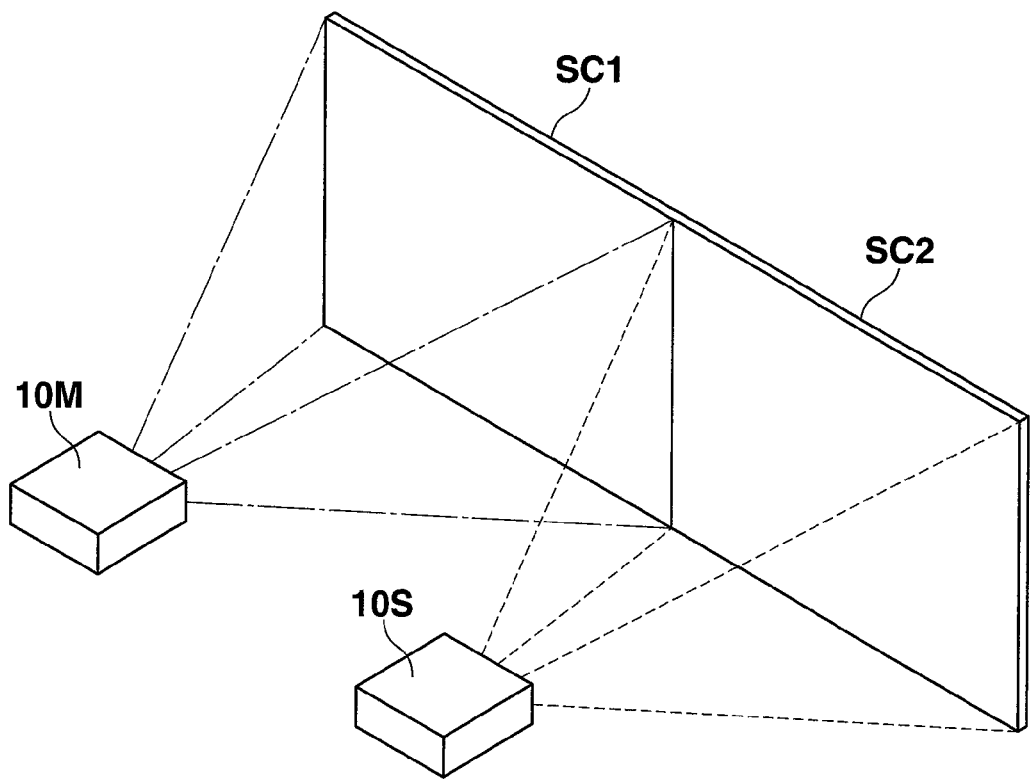
FIG. 3B shows a projection environment in which parallel projection is performed in the projector system according to the embodiment.

FIGS. 3A and 3B each show a manner of projecting images by the projector system 10 according to the embodiment.

As shown in FIG. 1 previously, FIG. 3A shows a manner of projection that two projector apparatuses 10M and 10S are set stacked on one another and images projected from both projector apparatuses 10M and 10S overlap each other on the screen SC.

Though not shown in the figures, pitching angles of optical axes are adjusted individually for projector apparatuses 10M and 10S in consideration of lengths of legs, to make projection ranges matched with each other.

FIG. 3B shows a manner of projection onto multiple screens that the two projector apparatuses 10M and 10S are set separate from each other in a horizontal direction and images projected from both projector apparatuses 10M and 10S are arranged in parallel on two adjacent screens SC1 and SC2 adjacent to each other, respectively.

Though not shown in the figure, pitching angles of optical axes of projected images are adjusted individually for projector apparatus 10M and projector apparatus 10S also in consideration of lengths of legs, to make positions of borders of both the projected images matched with each other (matched with a boundary between the right side edge of the projected image from projector apparatus 10M and the left side edge of the projected image from projector apparatus 10S), and to make positions of both images aligned with each other in the vertical directions (up and down directions). In this manner, wide image projection can be achieved by using multiple screens.

Figure 4:
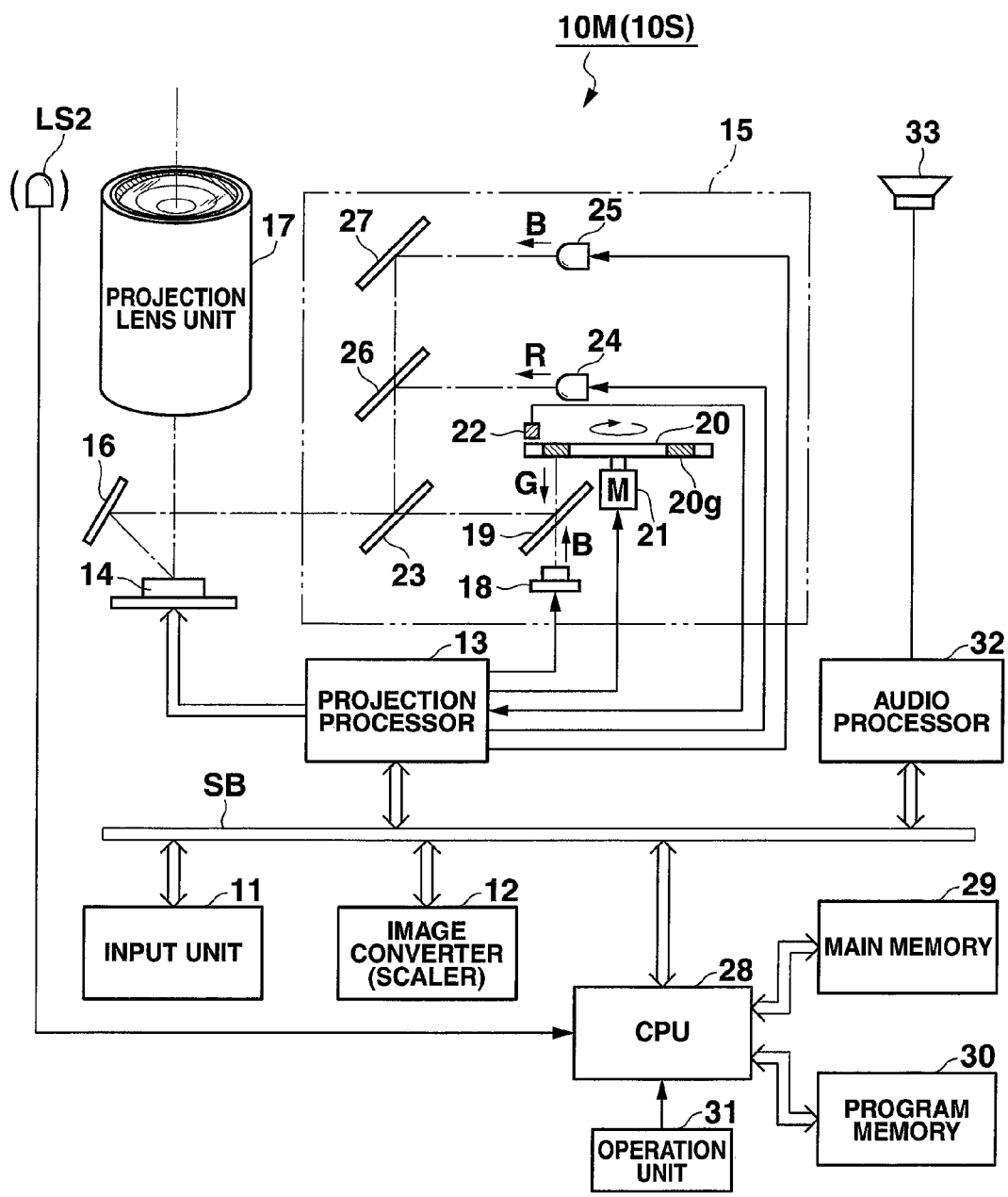
FIG. 4 is a block diagram showing a schematic configuration of functional circuits of the projector apparatus according to the embodiment.

Next, a schematic configuration of functional circuits in projector apparatuses 10M and 10S will be described with reference to FIG. 4.

An input unit 11 includes, for example, a video input terminal of a pin jack (RCA) type, a RGB input terminal of a D-sub15 type.

Analog image signals according to various standards, which are input to the input unit 11, are digitized if needed by the input unit 11, and are then fed to an image converter 12 through a system bus SB.

The image converter 12 is also referred to as a scaler, and uniformly converts input image data into image data of a predetermined format suitable for projection, and feeds the image data to the projection processor 13.

A projection processor 13 drives a micromirror element 14 as a spatial optical modulator to perform display by higher-speed time-divisional driving in which a frame rate in compliance with the predetermined format of, for example, 120 frames/second, a number of color components, and a number of display gradations are multiplied according to the fed image data.

The micromirror element 14 individually operates a plurality of micromirrors arrayed on a wide extended graphic array (WXGA: 800 pixels by 1280 pixels) to turn on/off individuals of inclination angles of the micromirrors at high speed to display an image and accordingly to form an optical image by reflection light thereof.

On the other side, light is emitted in primary colors R, G, and B cyclically in a time-divisional manner from the light source unit 15.

The light of primary colors from the light source unit 15 is totally reflected by a mirror 16 and is irradiated onto the micromirror element 14.

An optical image is then formed by the reflection light from the micromirror element 14. The formed optical image is projected and displayed through the lens unit 17 onto an unillustrated screen as a projection target.

The light source unit 15 includes a laser diode (LD) 18 which emits blue laser light.

The blue laser light (B) which the LD 18 emits penetrates a dichroic mirror 19 and is thereafter irradiated onto a peripheral surface of a fluorescent wheel 20.

The fluorescent wheel 20 is rotated by a wheel motor (M) 21, and a fluorescent layer 20g is formed over the whole annular peripheral surface which is irradiated with the blue laser light.

On the back of the surface where the fluorescent layer 20g of the fluorescent wheel 20 is formed, an unillustrated reflection plate is provided so as to overlap the fluorescent layer 20g.

At an end part of the peripheral surface of the fluorescent wheel 20, a wheel marker (not shown) is provided which denotes a reference rotation position for synchronizing rotation of the fluorescent wheel 20.

The projection processor 13 detects a rotation state indicating whether the fluorescent wheel 20 rotates normally or not, by referring to the marker sensors 22.

As the fluorescent layer 20g of the fluorescent wheel 20 is irradiated with the blue laser light, green light G is excited as reflection light.

The green light is reflected by a dichroic mirror 19, penetrates the dichroic mirror 23, and reaches the mirror 16.

Further, the light source unit 15 includes a light emitting diode (LED) 24 which emits red light, and a LED 25 which emits blue light.

The red light emitted by the LED 24 is reflected by a dichroic mirror 26, is further reflected by the dichroic mirror 23, and then reaches the mirror 16.

The blue light emitted by the LED 25 is reflected by a mirror 27 and penetrates the dichroic mirror 26. The light is then reflected by the dichroic mirror 23 and reaches the mirror 16.

As described above, the dichroic mirror 19 allows blue light to penetrate while the dichroic mirror 19 reflects green light.

The dichroic mirror 23 allows blue light to penetrate while the dichroic mirror 23 reflects green light and red light.

The dichroic mirror 26 allows blue light to penetrate while the dichroic mirror 26 reflects red light.

Under control of a CPU 28 described later, the projection processor 13 performs formation of an optical image by displaying an image through the micromirror element 14, light emission from each of the LD 18 and LEDs 24 and 25, rotation of the fluorescent wheel 20 by the wheel motor 21, and detection of a rotation state of the fluorescent wheel 20 by the marker sensor 22.

A light sensing signal detected by a light sensor LS2 which is provided adjacently in front of the projection lens unit 17 is input to the CPU 28 on the side of projector apparatus 10S as a slave.

The light sensor LS2 is provided as a mandatory component in projector apparatus 10S as a slave, and has light sensing properties (performance) equivalent to the light sensor LS1 of the 3D liquid-crystal eyewear GL, i.e., an object wave-length range, a directivity, and a light sensitivity.

In an ordinary product configuration, the light sensor LS2 is provided in (or may be additionally attached to) projector apparatus 10M as a master. Projector apparatus 10M which is set as a master may be configured to be capable of suspending or invalidating the function of the light sensor LS2.

With the configuration as described above, individuals of the projector apparatuses can have a common design.

The light sensor LS2 as an option may be optionally set in front of the projection lens unit 17 on the side of projector apparatus 10S as a slave.

The light sensor LS2 is arranged to have a light-sensing optical axis parallel to the projection optical axis of the projection lens unit 17, and has a so wide directivity as the light sensor LS1 of the 3D liquid-crystal eyewear GL. The light sensor LS2 performs luminous-intensity detection over a wide range centered on the direction of the image which the projection lens unit 17 projects.

The CPU 28 controls all operation of each of circuits described above.

The CPU 28 is directly connected to a main memory 29 and a program memory 30.

The main memory 29 is configured by, for example, a SRAM and functions as a work memory for the CPU 28.

The program memory 30 is configured by an electrically rewritable nonvolatile memory, and stores operation programs to be executed by the CPU 28, data in various fixed forms, and the like.

The CPU 28 performs control operations inside projector apparatuses 10M and 10S by using the main memory 29 and the program memory 30.

The CPU 28 performs a variety of projection operations in accordance with key operation signals from an operation unit 31.

The operation unit 31 includes a key operation unit provided on a body of each of projector apparatuses 10M and 10S, and a laser receiving unit which receives infrared light from an unillustrated remote controller specialized for projector apparatuses 10M and 10S. Key operation signals based on keys which the user operates by the operation unit or the remote controller are directly output to the CPU 28.

The CPU 28 is also connected to an audio processor 32 through the system bus SB.

The audio processor 32 includes a sound source circuit, such as a PCM tone generator, and converts audio data supplied during a projection operation into an analog signal. The audio processor 33 enhances and outputs a sound by driving a loudspeaker unit 33 or generates a beep sound if needed.

Figure 5:
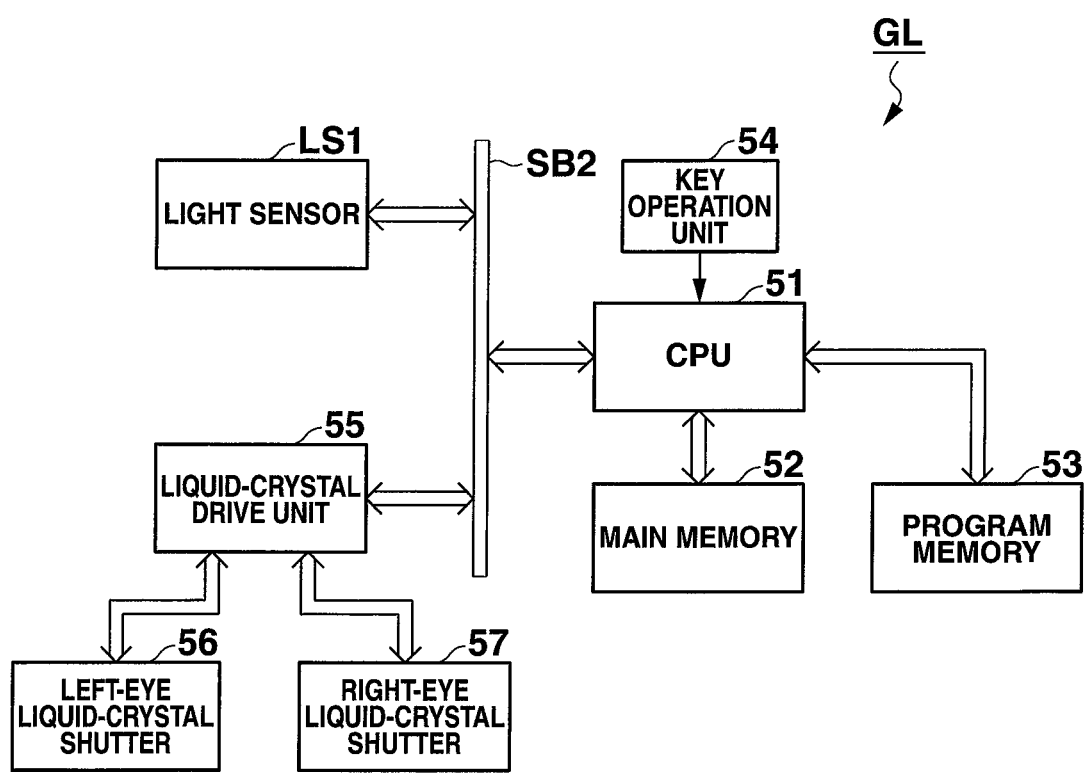
FIG. 5 is a block diagram showing a schematic configuration of functional circuits of 3D liquid-crystal eyewear GL according to the embodiment.

Next, the functional configuration of the 3D liquid-crystal eyewear GL will be described with reference to FIG. 5.

Luminous intensity of the screen SC detected by the light sensor LS1 is digitized and then fed to a CPU 51 through a system bus SB2.

The CPU 51 manages control operations relating to the whole 3D liquid-crystal eyewear GL, and is directly connected to a main memory 52 and a program memory 53.

The main memory 52 functions as a work memory for the CPU 51.

The program memory 53 stores various programs to be performed by the CPU 51 and data in various forms.

The CPU 51 performs control operations inside the 3D liquid-crystal eyewear GL by using the main memory 52 and the program memory 53.

Further, key operation signals are directly input from the key operation unit 54 to the CPU 51.

The key operation unit 54 includes a power supply key to switch on/off a power supply for the 3D liquid-crystal eyewear GL.

The CPU 51 is further connected to a liquid-crystal drive unit 55 through the system bus SB2.

The liquid-crystal drive unit 55 drives a left-eye liquid-crystal shutter 56 forming part of the left-eye lens of the 3D liquid-crystal eyewear GL and a right-eye liquid-crystal shutter 57 forming part of the right-eye lens thereof to be made alternately phototransmissive and photo-obstructive in turn, under control of the CPU 51.

Operation of the present embodiment will now be described below.

As has already been described, projector apparatuses 10M and 10S each perform all operations described below after any of operation programs, fixed data, and the like read from the program memory 30 by the CPU 28 are developed over and stored into the main memory 29.

In order to simplify descriptions, each one frame of color images for the left and right eyes is supposed to be configured by total 4 fields, i.e., a synchronization field, and 3 fields for B (blue), R (red), and G (green). Each of the fields is set to a time corresponding to ¼ of the color image frame (L/R frame) for both the left and right eyes.

Further, to perform the present operation, as described above, settings are supposed to have been executed on projector apparatus 10M as a master and projector apparatus 10S as a slave by settings using unillustrated manual switches or a remote controller.

Figure 6:
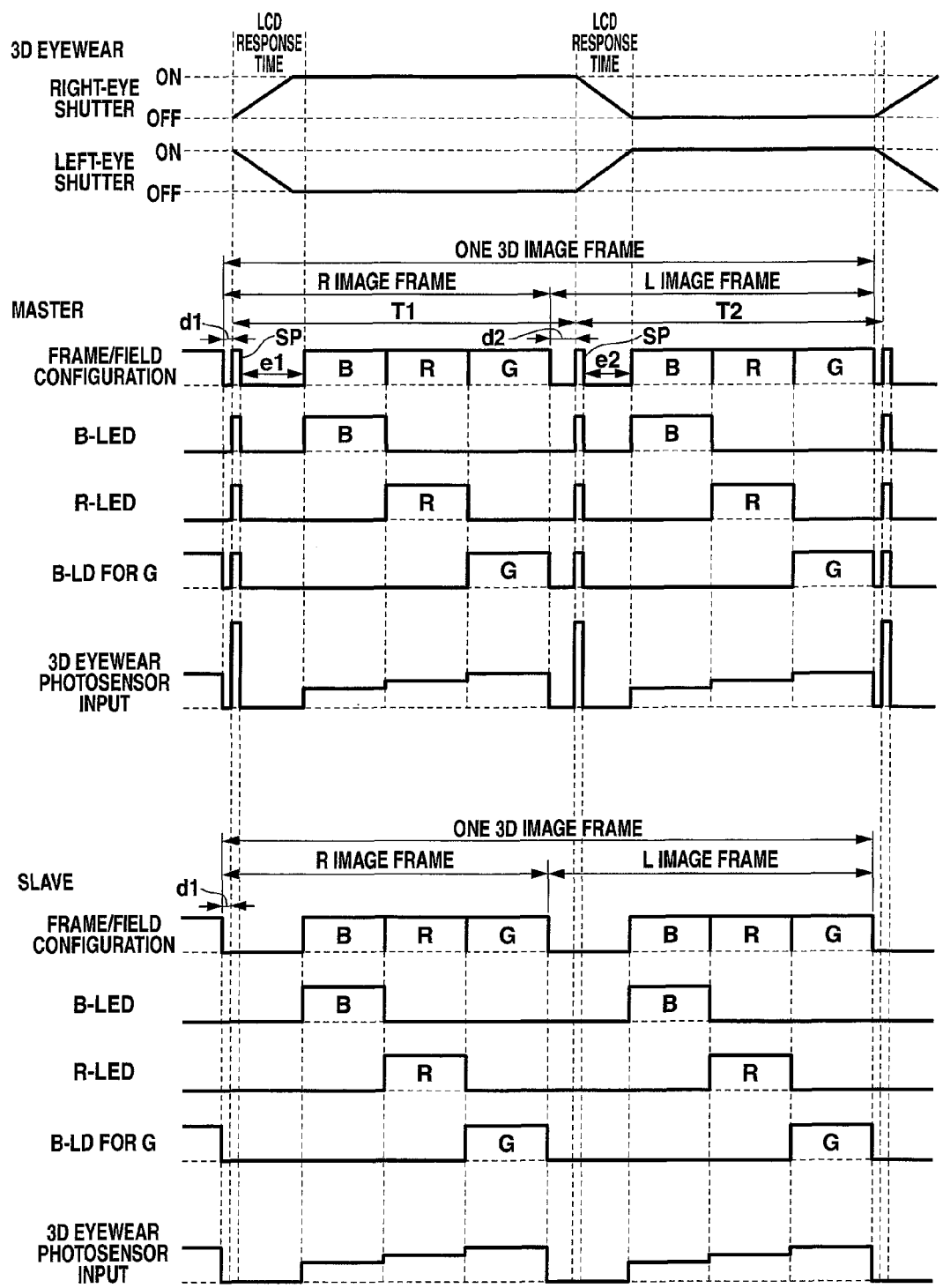
FIG. 6 is a timing chart of light source driving at the time of 3D image projection according to the embodiment.

FIG. 6 shows light emission timings of the light source units 15 in projector apparatuses 10M and 10S and operations of the 3D liquid-crystal eyewear GL, during two frames forming one frame of a 3D image, i.e., during one right-eye (R) image frame and one left-eye (L) image frame.

A part of FIG. 6 relating to the 3D liquid-crystal eyewear GL shows a shutter switch operation of the 3D liquid-crystal eyewear GL which operates in accordance with the image projected by projector apparatus 10M.

A part of FIG. 6 relating to the master shows an operation of projector apparatus 10M as the master.

A part of FIG. 6 relating to the slave shows an operation of projector apparatus 10S as the slave.

As shown in parts of FIG. 6 relating to a frame/field configuration, B-LED, R-LED, and B-LD for G in the master, the LD 18, LED 24, and LED 25 which are semiconductor light emitting devices as light sources are all turned off, at the beginning of the right-eye (R) image frame projected by projector apparatus 10M. The LD 18, LED 24, and LED 25 are simultaneously turned on, as a synchronization signal SP, by the projection processor 13 for a period equivalent to a predetermined pulse width from a timing when a time d1 elapses, for example, ¹⁄₁₈₀ of L/R frame.

Therefore, white light as mixture of G, R, and B colors is irradiated onto the micromirror element 14. During this time, all the light irradiated by total surface reflection of the micromirror element 14 changes into reflection light in a direction to the projection lens unit 17.

Therefore, on the screen SC, the image having high luminance which makes the whole surface white is projected for such a very short time period that is not perceivable for the user US.

Thereafter, the projection processor 13 turns off all of the LD 18, LED 24, and LED 25 during a time e1 until the synchronization field ends.

Such a turn-off period as described is a response time to show the subsequent right-eye image by opening (switching on) the liquid-crystal shutter for the right-eye lens on the side of the 3D liquid-crystal eyewear GL, as shown at a part of the 3D eyewear in FIG. 6.

In the next B field, only the LED 25 is driven to turn on for a period equivalent to ¼ of L/R frame.

The projection processor 13 forms a blue optical image for the right eye through the micromirror element 14 by the blue light which the LED 25 emits, and projects the formed image to the screen SC by the projection lens unit 17.

In the next R field, only the LED 24 is driven to turn on for a period equivalent to ¼ of L/R frame.

The projection processor 13 forms a red optical image for the right eye through the micromirror element 14 by the red light which the LED 24 emits, and projects the formed image to the screen SC by the projection lens unit 17.

In the next G field, only the LD 18 is driven to turn on for a period equivalent to ¼ of L/R frame.

The projection processor 13 forms a green optical image for the right eye through the micromirror element 14 from green light which is obtained by irradiating the blue light emitted from the LD 18 onto the fluorescent layer 20*g* of the fluorescent wheel 20. The projection processor 13 projects the formed image to the screen SC by the projection lens unit 17.

In the subsequent left-eye (L) image frame, the LD 18, LED 24, and LED 25 which are semiconductor light emitting devices as light sources are all turned off, at the beginning of the synchronization field. The LD 18, LED 24, and LED 25 are simultaneously turned on, as the synchronization signal SP, by the projection processor 13 for a period equivalent to a predetermined pulse width from a timing when a time d2 elapses, for example, ¹⁄₁₈₀ of L/R.

Therefore, white light as mixture of G, R, and B colors is irradiated onto the micromirror element 14. During this time, all the light irradiated by total surface reflection of the micromirror element 14 changes into reflection light in a direction to the projection lens unit 17.

Therefore, on the screen SC, the image having high luminance which makes the whole surface white is projected for such a very short time period that is not perceivable for the user US.

Thereafter, the projection processor 13 turns off all of the LD 18, LED 24, and LED 25 again during a time e1 until the synchronization field ends.

Such a turn-off period is a response time to show the subsequent left-eye image by opening (switching on) the liquid-crystal shutter for the left-eye lens on the side of the 3D liquid-crystal eyewear GL, as shown at a part of the 3D eyewear in FIG. 6.

In the subsequent B field, only the LED 25 is driven to turn on for a period equivalent to ¼ of L/R frame.

The projection processor 13 forms a blue optical image for the left eye through the micromirror element 14 by the blue light which the LED 25 emits, and projects the formed image to the screen SC by the projection lens unit 17.

In the subsequent R field, only the LD 24 is driven to turn on for a period equivalent o ¼ of L/R frame.

The projection processor 13 forms a red optical image for the left eye through the micromirror element 14 by the red light which the LED 24 emits, and projects the formed image to the screen SC by the projection lens unit 17.

In the subsequent G field, only the LD 18 is driven to turn on for a period equivalent to ¼ of L/R frame.

The projection processor 13 forms a green optical image for the left eye through the micromirror element 14 from green light which is obtained by irradiating the blue light emitted from the LD 18 onto the fluorescent layer 20g of the fluorescent wheel 20. The projection processor 13 projects the formed image to the screen SC by the projection lens unit 17.

The delay time d2 at the beginning of the frame is set to a greater value than the delay time d1 used for the right-eye (R) image frame.

Therefore, from a difference Δd (=d2−d1), a cycle T1 from light emission of the pulse of the synchronization signal SP in the right-eye (R) image frame to light emission of a pulse of the synchronization signal SP in the left-eye (L) image frame is longer by 2Δd than a cycle T2 from light emission of the pulse of the synchronization signal SP in the left-eye (L) image frame to light emission of the pulse of the synchronization signal SP in the subsequent right-eye (R) image frame.

A part of the 3D eyewear photosensor input relating to the master in FIG. 6 shows an example of intensity of light which enters the light sensor LS1 of the 3D liquid-crystal eyewear GL, from an image projected by projector apparatus 10M as a master.

In each of the B, R, and G fields, an incident light amount is of an optical image formed by a semiconductor light emitting device of a single color emits light. Accordingly, the incident light amounts are in an increasing order of B<R<G, because of differences in luminance among corresponding color components.

In comparison, the synchronization signal SP in the synchronization field at the beginning of each frame has a light amount which is of colors mixed by simultaneous light emission of three colors.

Therefore, the CPU 28 easily identifies only synchronization pulses by comparison with a much greater threshold than that for the G field. In addition, the CPU 28 can easily determine whether an image to be projected subsequently to a synchronization signal SP is for the right or left eye by sequentially measuring and comparing cycles T among the synchronization pulses.

Through operations as described above, the 3D liquid-crystal eyewear GL suspends the on/off (phototransmissive/photo-obstructive) operation which has been performed till then, upon detection of the synchronization signal SP, and repeatedly performs an operation of inversely setting the on/off (phototransmissive/photo-obstructive) operation during a period until start of the subsequent R field as a response period.

In contrast, an operation to be performed by projector apparatus 10S as a slave will be described with reference to a part of FIG. 6 relating to the slave.

As described above, projector apparatus 10S includes the light sensor LS2 equivalent to the light sensor LS1 of the 3D liquid-crystal eyewear GL, and can grasp the timing of the image which is projected by projector apparatus 10M, as well as the 3D liquid-crystal eyewear GL.

That is, without using communications which require product costs, such as cable connection via a USB cable or Bluetooth (registered trademark) as a short-distance wireless-communications standard, the master and the slave can be synchronized with each other by a simple mechanism as employed in the 3D liquid-crystal eyewear GL.

In addition, projector apparatus 10S as a slave does not need to output a dummy signal DP in the synchronization field, when two images are projected onto one screen SC, overlapped on each other, as shown in FIG. 3A.

That is, in projector apparatus 10S as a slave as shown in parts of FIG. 6 relating to the frame, field configuration, B-LED, R-LED, and B-LD for G with respect to the slave, the projection processor 13 turns off each of the LD 18, LED 24, and LED 25 in the synchronization field in the right-eye (R) image frame.

In the projection operation in the subsequent B, R, and G fields, projector apparatus 10S projects an image according to the image signal input from the input unit 11, at the same timing as projector apparatus 10M.

Thereafter, in the left-eye (L) image frame, the projection processor 13 also turns off all of the LD 18, LED 24, and LED 25 during the synchronization period.

In the projection operation in the subsequent B, R, and G fields, projector apparatus 10S projects an image according to the image signal input from the input unit 11, at the same timing as projector apparatus 10M.

A part of the 3D eyewear photosensor input relating to the slave in FIG. 6 shows an example of intensity of light which enters the light sensor LS1 of the 3D liquid-crystal eyewear GL, from an image projected by projector apparatus 10S as the slave.

In each of the B, R, and G fields, an incident light amount is of a formed optical image as a semiconductor light emitting device of a single color emits light. Therefore, the incident light amount are in the increasing order of B<R<G, owing to differences in luminance among corresponding color components.

In comparison, light emission driving is not performed at all in the synchronization field at the beginning of each frame. Therefore, the amount of light which enters the light sensor LS1 by the image projected from projector apparatus 10S is zero.

According to the present embodiment, for the user wearing the 3D liquid-crystal eyewear GL, a phenomenon of more or less whitening dark parts, which is called black dimming (black (level) floating) and occurs particularly in dark images, can occur because of the synchronization signal SP in the image projected by projector apparatus 10M as a master.

On the other hand, the image projected by projector apparatus 10S as a slave does not cause such black dimming since there is no light which does not relate to the projection image corresponding to the synchronization signal SP.

Therefore, there can be deviation in projection image quality between the two projector apparatuses 10M and 10S.

Such deviation of projection image quality is not perceived when two images are projected onto one screen SC, overlapped on each other, as shown in FIG. 3A.

Figure 7:
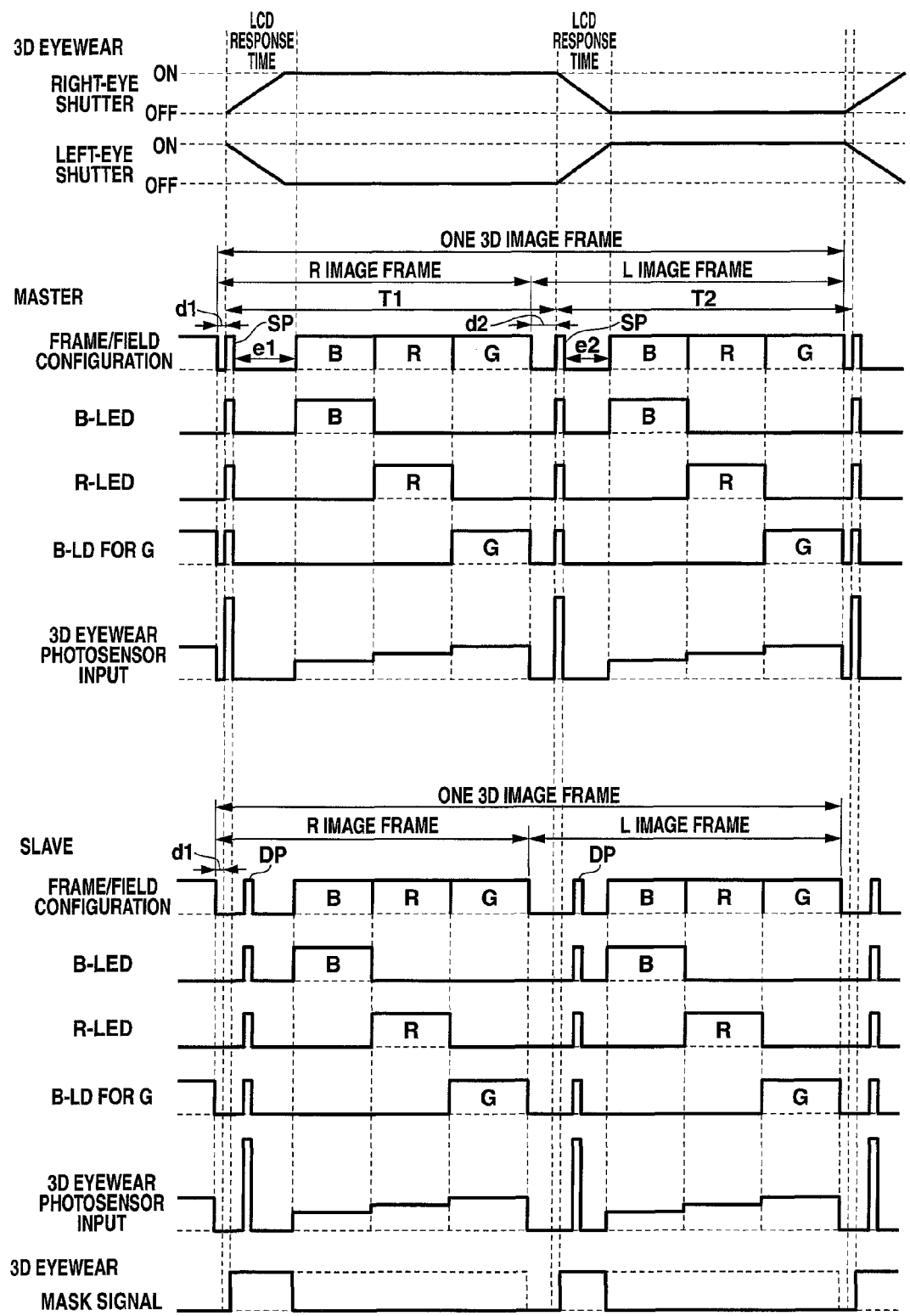
FIG. 7 is a timing chart of another light source driving at the time of 3D image projection according to the embodiment.

FIG. 7 shows a first example operation of equalizing image quality between two projection images, in place of the drive operation as shown in FIG. 6.

A part of FIG. 7 relating to the 3D liquid-crystal eyewear GL shows a shutter switch operation of the 3D liquid-crystal eyewear GL which operates in accordance with the image projected by projector apparatus 10M.

A part of FIG. 7 relating to the master shows operations of projector apparatus 10M as the master.

A part of FIG. 7 relating to the slave shows operations of projector apparatus 10S as the slave.

Operations on the side of projector apparatus 10M as the master are the same as those of FIG. 6 above and will therefore be omitted from descriptions below.

Projector apparatus 10S as a slave is configured to project a dummy pulse as follows, in order to equalize image quality with the master when two images are projected in parallel as shown in FIG. 3B above.

That is, as shown at parts of FIG. 7 relating to the frame, field configuration, B-LED, R-LED, and B-LD for G, projector apparatus 10S as a slave turns on the LD 18, LED 24, and LED 25 by the projection processor 13 for a predetermined pulse width which is totally the same as that of the synchronization signal SP, for example, a time corresponding to $\frac{1}{180}$ of L/R frame, in order to project a dummy signal DP which has luminous energy corresponding to the synchronization signal SP, while avoiding the timing of the synchronization signal SP projected by projector apparatus 10M, at the beginning of the right-eye (R) image frame, at the later timing.

Therefore, at the later timing out of the range of the synchronization signal SP from projector apparatus 10M, white light as mixture of G, R, and B colors is irradiated onto the micromirror element 14. During this time, all the light irradiated by total surface reflection of the micromirror element 14 changes into reflection light in a direction to the projection lens unit 17.

Therefore, on the screen SC, the image having high luminance which makes the whole surface white is projected for such a very short time period that is not perceivable for the user US.

In this manner, the influence of the white corresponding to the dummy signal DP which occupies the image projected by projector apparatus 10S, received by the 3D liquid-crystal eyewear GL is substantially equal to the influence of the white which occupies the image projected by projector apparatus 10M.

Thereafter, the projection processor 13 turns off all of the LD 18, LED 24, and LED 25 until the synchronization field ends.

In the projection operation in the subsequent B, R, and G fields, projector apparatus 10S projects an image according to the image signal input from the input unit 11, at the same timing as projector apparatus 10M.

Also in the subsequent left-eye (L) image frame, the projection processor 13 projects a dummy signal DP which has luminous energy corresponding to the synchronization signal SP, while avoiding the timing of the synchronization signal SP to be projected by projector apparatus 10M at the beginning of the synchronization field, at the later timing.

Therefore, also in the left-eye (L) image frame, at the later timing out of the range of the synchronization signal SP from projector apparatus 10M, white light as mixture of G, R, and B colors is irradiated onto the micromirror element 14. During this time, all the light irradiated by total surface reflection of the micromirror element 14 changes into reflection light in a direction to the projection lens unit 17.

Therefore, on the screen SC, the image having luminance which makes the whole surface white is projected for such a very short time period that is not perceivable for the user US.

In this manner, also in the left-eye (L) image frame, the influence of the white corresponding to the dummy signal DP which occupies the image projected by projector apparatus 10S, received by the 3D liquid-crystal eyewear GL is substantially equal to the influence of the white which occupies the image projected by projector apparatus 10M.

Thereafter, the projection processor 13 turns off all of the LD 18, LED 24, and LED 25 until the synchronization field ends.

In the projection operation in the subsequent B, R, and G fields, projector apparatus 10S projects an image according to the image signal input from the input unit 11, at the same timing as projector apparatus 10M.

A part of the 3D eyewear photosensor input relating to the slave in FIG. 7 shows an example of intensity of light which enters the light sensor LS1 of the 3D liquid-crystal eyewear GL, from an image projected by projector apparatus 10S as the slave.

In each of the B, R, and G fields, an incident light amount is of an optical image formed as a semiconductor light emitting device of a single color emits light. Therefore, the incident light amounts are in the order of B<R<G, owing to differences in luminance among corresponding color components.

In comparison, the dummy signal DP in the synchronization field at the beginning of each frame is projected at a timing which is intentionally shifted backward from the synchronization signal SP generated by projector apparatus 10M, and has a light amount corresponding to color mixture of simultaneous light emission of three colors at an equal amount.

Therefore, from a fall timing of the synchronization signal SP to at least start of the next B field, as shown in a part of a mask signal of 3D eyewear in FIG. 7, or to an end of the G field, the 3D liquid-crystal eyewear GL generates a mask signal which invalidates operations according to light reception by the light sensor LS1, to internally perform controls concerning synchronization, and temporarily suspends a light receiving operation of the light sensor LS1, to prevent error detection in synchronization.

In this manner, the 3D liquid-crystal eyewear GL can exclude the influence on synchronization operations from the dummy signal DP from projector apparatus 10S, and continue a switch operation of switching on/off (phototransmissive/photo-obstructive) the left and right shutters. Simultaneously, power consumption of the light sensor LS1 can be reduced as much as possible.

Further according to the operations shown in FIG. 7, a degree of projection of a more or less whitened dark part in the image projected by projector apparatus 10M as a master due to the synchronization signal SP, which is called black dimming and occurs particularly in dark images, and a degree of projection of a more or less whitened dark part in the image projected by projector apparatus 10S as a slave due to the dummy signal DP, which is also called black dimming, are equal for the user wearing the 3D liquid-crystal eyewear GL. Projection image quality can be equalized between the two projector apparatus 10M and 10S.

Thus, the feature of equalizing the image quality between two projection images is applicable to projection of two images arranged in parallel, as shown in FIG. 3B. Accordingly, black dimming occurring in the two images projected and arranged in parallel can be substantially equalized. The user US does not become conscious of a seam between images projected on the screens SC1 and SC2 and therefore can view the images without a feel of discomfort.

Figure 8:
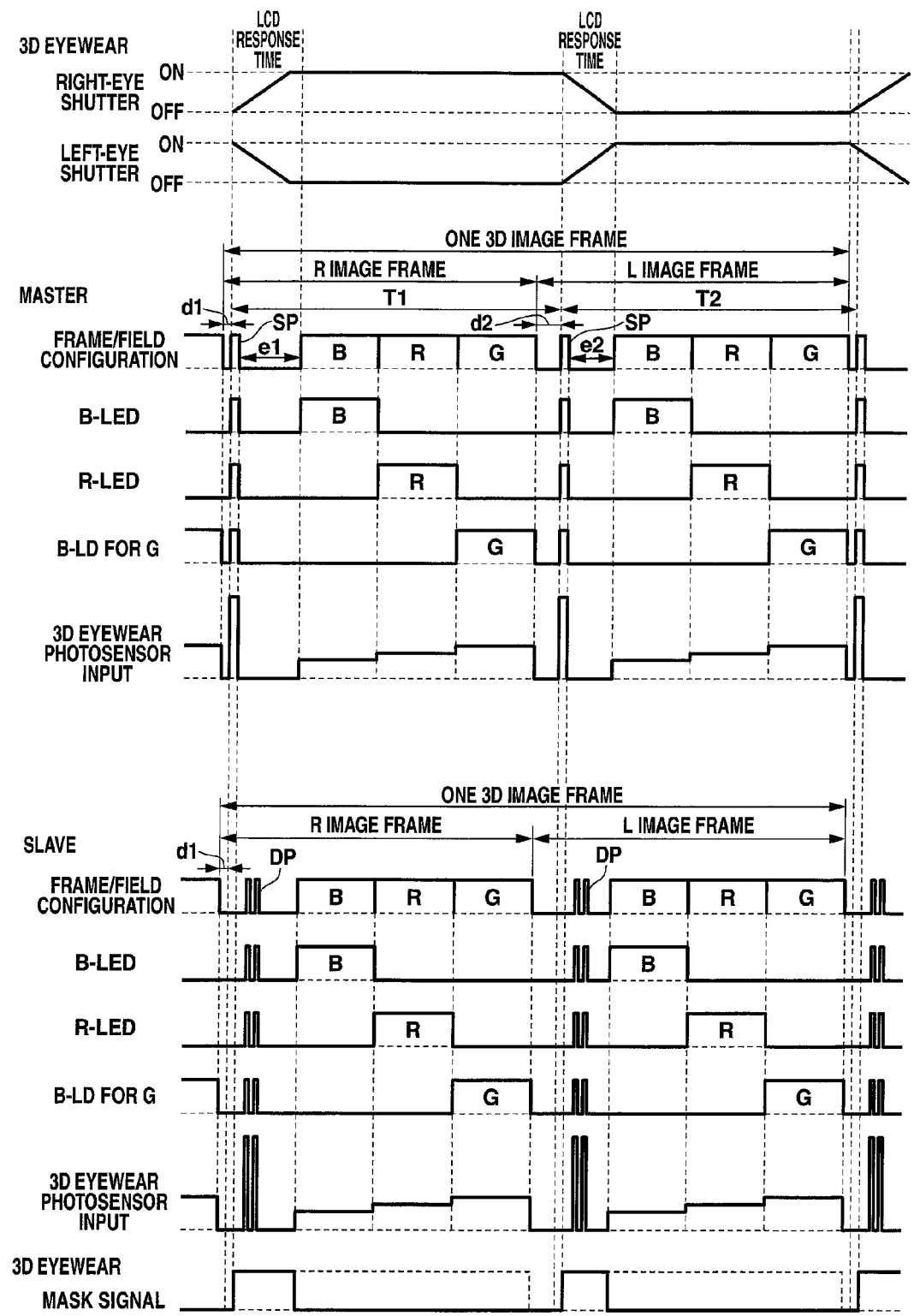
FIG. 8 is a timing chart of yet another light source driving at the time of 3D image projection according to the embodiment.

FIG. 8 shows a second example operation of equalizing image quality between two projection images, in place of the drive operations as shown in FIG. 7. Specifically, FIG. 8 shows a case that projector apparatus 10S as a slave in the part of the slave of FIG. 8 simultaneously turns on the LD 18, LED 24, and LED 25 by the projection processor 13 for a predetermined pulse width which is totally the same as that of the synchronization signal SP, for example, a time corresponding to $\frac{1}{180}$ (($\frac{1}{360}$)*2) of L/R frame, in order to project intermittent sequential two pulses as one dummy signal DP which have equal luminous energy, unlike the synchronization signal SP in form of a single pulse which is projected by projector apparatus 10M as a master.

The influence of the white corresponding to even the dummy signal DP having such a waveform as described above, which occupies the signal projected by projector apparatus 10S, received by the 3D liquid-crystal eyewear GL, is substantially equal to the influence of the white which occupies the image projected by projector apparatus 10M.

Figure 9:
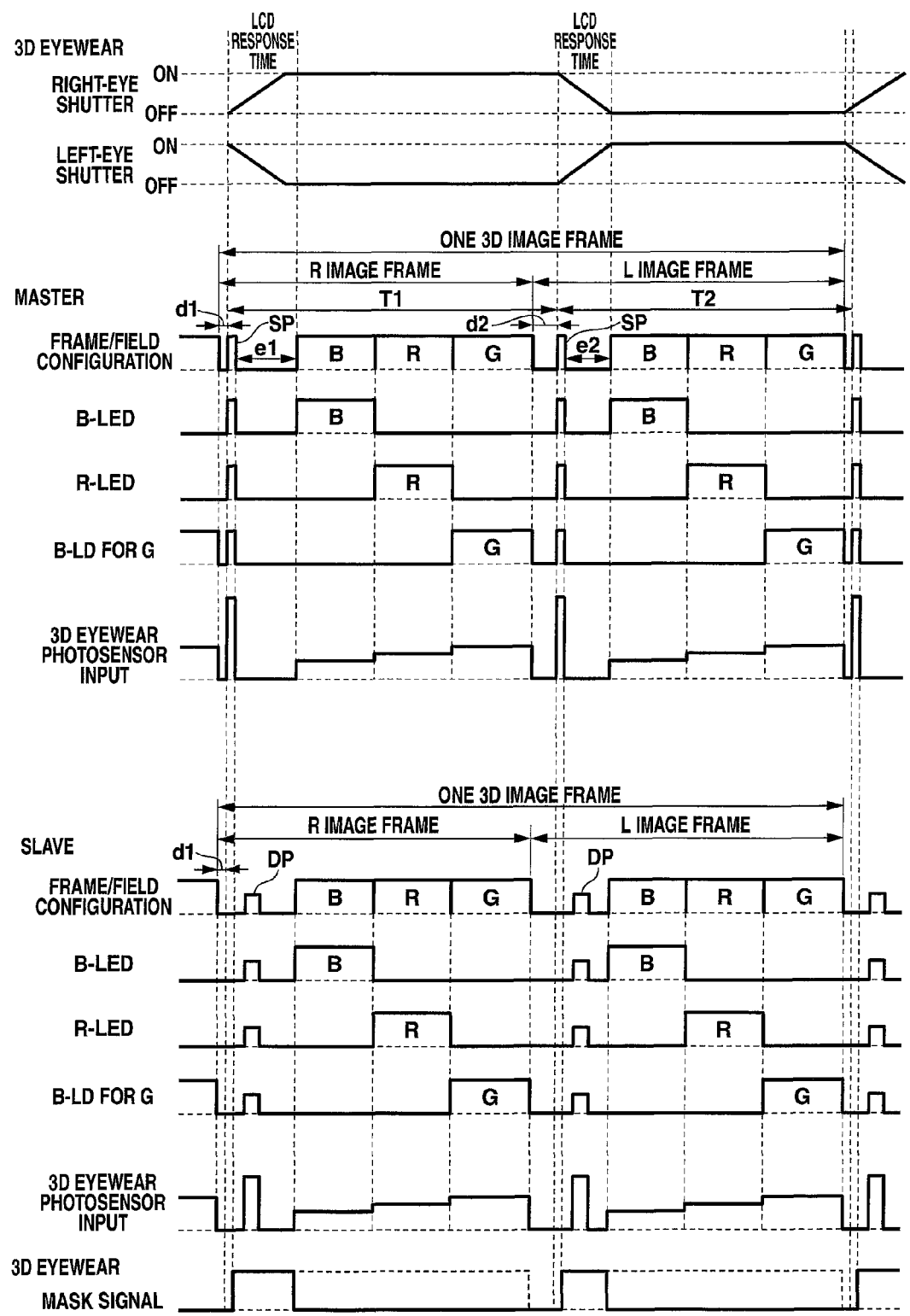
FIG. 9 is a timing chart of yet another light source driving at the time of 3D image projection according to the embodiment.

FIG. 9 shows a third example operation of equalizing image quality between two projection images, in place of the drive operations as shown in FIG. 7 or 8. Specifically, FIG. 9 shows a case that projector apparatus 10S as a slave in the part of the slave of FIG. 9 simultaneously turns on the LD 18, LED 24, and LED 25 at substantially half luminance by the projection processor 13 for a pulse width which is totally twice the pulse width of the synchronization signal SP, for example, a time of 1/90 corresponding to twice the 1/180 of L/R frame, as a dummy signal DP which differs from and has equal luminous energy to the synchronization signal SP projected by projector apparatus 10M as a master.

The influence of the white corresponding to even the dummy signal DP having such a waveform as described above, which occupies the signal projected by projector apparatus 10S, received by the 3D liquid-crystal eyewear GL, is substantially equal to the influence of the white which occupies the image projected by projector apparatus 10M.

Although the LD 18, LED 24, and LED 25 have been described as components which turns on the dummy signal DP at substantially half luminance, the LD 18, LED 24, and LED 25 may be intentionally made to emit light at full energy, and the total surface reflection time may be reduced to half by the micromirror element 14, to obtain ½ gradations, or may be driven to display on and off pixels arranged in a layout like a checker pattern, to uniformly switch off half of pixels. In this manner, luminance of light emission from the projection lens unit 17 can be reduced to half.

Further, FIGS. 7, 8, and 9 each has been described a case where the dummy signal DP which projector apparatus 10S as a slave emits in the in the synchronization field is uniform throughout the L/R frame. However, even if the dummy signal DP has different waveforms respectively in the L frame and the R frame, the dummy signal DP deems to be satisfactorily practicable insofar as the dummy signal DP has luminous energy substantially equal to that of the synchronization signal SP.

However, taken into consideration response properties at a rise and a fall when the left-eye liquid-crystal shutter 56 and the right-eye liquid-crystal shutter 57 of the 3D liquid-crystal eyewear GL are switched in response fields, the waveform of the dummy signal DP is desirably uniform throughout the L/R frame in order to cancel luminance after transmission of the dummy signal DP for uniform quality.

Further, if ferroelectric liquid crystal capable of high-speed response at a response speed of 1 ms or less, such as 0.2 ms, can be used for the left-eye liquid-crystal shutter 56 and the right-eye liquid-crystal shutter 57 of the 3D liquid-crystal eyewear GL, the phenomenon of black dimming caused by the synchronization signal SP as described above can be excluded securely.

Figure 10:
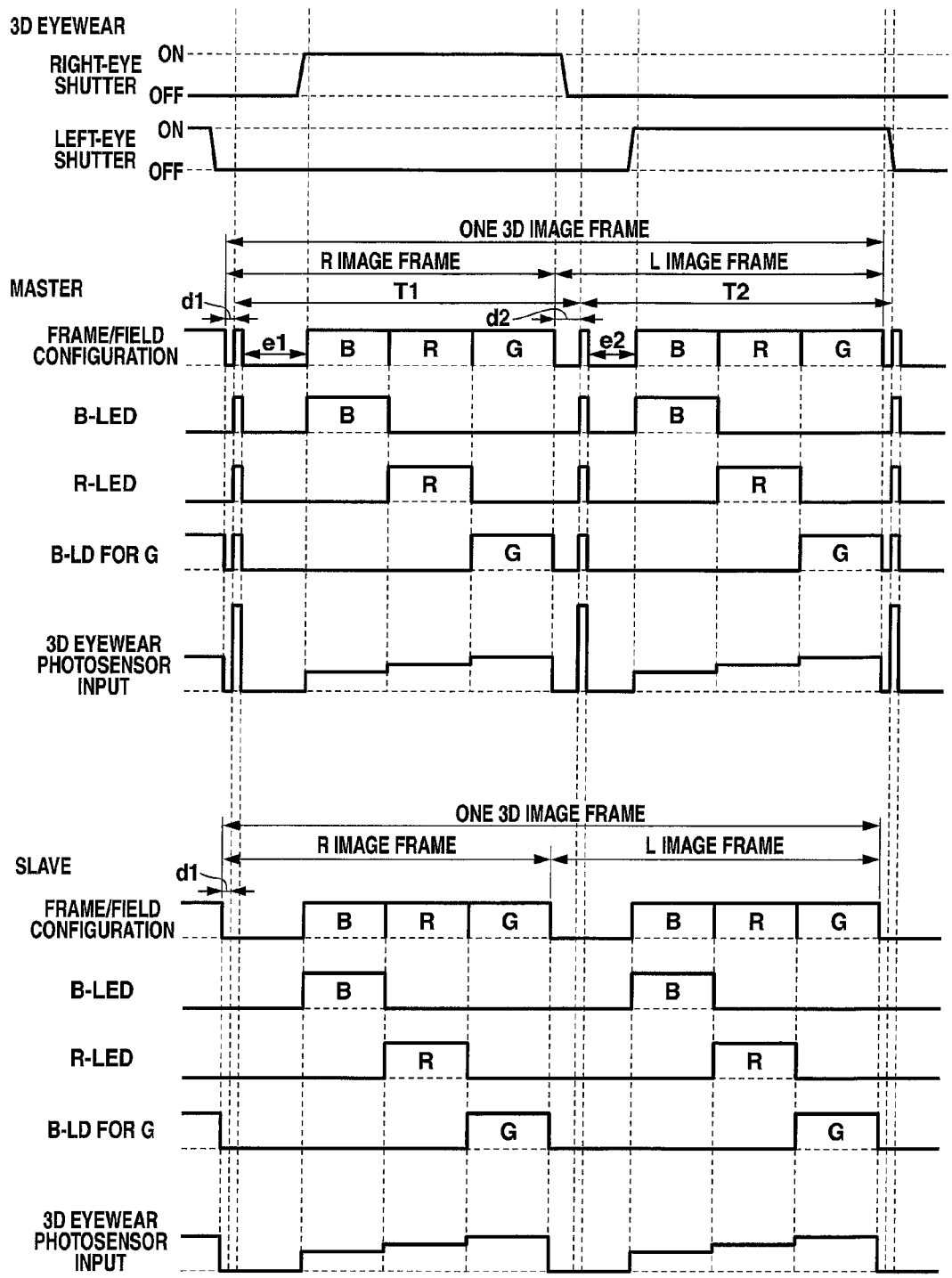
FIG. 10 is a timing chart of yet another light source driving at the time of 3D image projection according to the embodiment.

FIG. 10 shows an example operation where the 3D liquid-crystal eyewear GL including the liquid-crystal shutters 56 and 57 as described above can be used in place of the drive operations as shown in FIG. 6, 7, 8, or 9.

A part of FIG. 10 relating to the 3D liquid-crystal eyewear GL shows a shutter switch operation of the 3D liquid-crystal eyewear GL which operates in accordance with the image projected by projector apparatus 10M.

A part of FIG. 10 relating to the master shows operations of projector apparatus 10M as a master.

A part of FIG. 10 relating to the slave shows operations of projector apparatus 10S as a slave.

As shown in the part of the 3D eyewear in FIG. 10, the right-eye liquid-crystal shutter 57 of the 3D liquid-crystal eyewear GL is driven to switch on (transmit) with a slight time margin, only in the B, R, and G fields of projecting an actual image in the right-eye image frame by projector apparatus 10M and to switch off (shut) during the other periods.

On the other side, the left-eye liquid-crystal shutter 56 is driven to switch on (phototransmissive) with a slight time margin, only in the B, R, and G fields of projecting an actual image in the left-eye image frame by projector apparatus 10M and to switch off (shut) during the other periods.

Therefore, at the timing of the synchronization signal SP arranged at the beginning of the synchronization field projected by projector apparatus 10M, both the right-eye liquid-crystal shutter 57 and the left-eye liquid-crystal shutter 56 are off (shut), and the user wearing the 3D liquid-crystal eyewear GL does not perceive black dimming due to the synchronization signal SP.

Therefore, the projection processor 13 does not need to output the dummy signal DP corresponding to the synchronization signal SP in the synchronization field, in projector apparatus 10S as a slave.

Thus, when high-speed liquid-crystal shutters capable of sufficiently reducing the response time can be used for the 3D liquid-crystal eyewear GL, the occurrence of black dimming can be suppressed and the projection image quality can be improved. In addition, the period of the synchronization field in one color image frame can be set shorter, and the periods of B, R, and G fields can be set longer to a corresponding extent. Contribution to projection of a brighter image is therefore available.

The above embodiment has been described with reference to examples where a 3D display apparatus which performs 3D display (stereoscopic display) by parallax between two images is used as each of display apparatuses which switches and displays left- and right-eye images, and 3D eyewear is a display assist apparatus (viewer eyewear). However, the invention is not limited to the examples.

Needless to say, the invention is further applicable to, for example, a display system which time-divisionally displays different images without using parallax.

According to the embodiment as has been described, corresponding left eye and right eye images can be steadily viewed even with one 3D liquid-crystal eyewear GL (as glasses for visually reorganization, a display assist apparatus), where a plurality of projector apparatuses (as display apparatuses) 10M and 10S each of which switches and projects left- and right-eye images are operated in parallel.

In this respect, particularly projector apparatus 10S as a slave controls projection during a period corresponding to the synchronization signal SP projected by projector apparatus 10M. Interference (operation errors) of the 3D liquid-crystal eyewear GL can therefore be avoided.

Also projector apparatus 10S is provided with the light sensor LS2 which is the same as the light sensor LS1 of the 3D liquid-crystal eyewear GL, and detects a timing of the image projected by projector apparatus 10M, to thereby obtain synchronization information. Therefore, projector apparatus 10S can synchronize the timing of projecting an image with the synchronization information.

Also in the above embodiment, a light amount of the synchronization signal SP projected by projector apparatus 10M as a master during a synchronization field, and a light amount of the dummy signal DP projected later than the synchronization signal SP by projector apparatus 10S as a slave in the synchronization field are substantially equalized. Therefore, image quality can be uniform between two projection images.

Since projector apparatus 10S as a slave is configured to detect synchronization with projector apparatus 10M by using the light sensor LS2, a synchronization mechanism can be achieved with a simple configuration.

In this respect, particularly the same light sensor LS2 as the light sensor LS1 of the 3D liquid crystal eyewear GL is used for projector apparatus 10S, to synchronize with projector apparatus 10M as a master. Therefore, sharing of components can be improved more.

In the above embodiment, the synchronization signal SP can be detected by counting an interval between arrivals of the synchronization signal SP for 3D display, and can be distinguished from the dummy signal DP which arrives afterward. Therefore, the synchronization signal SP can be easily distinguished.

Aside from the embodiment described above, the synchronization signal SP may be set to be detectable depending on a waveform, for example, in form of intermittent sequential two pulses in a short time, such as the dummy signal DP shown in the part of the slave in FIG. 8. The synchronization signal SP can then be also easily distinguished.

Although the above embodiment has been described in case of applying the invention to a DLP (registered trademark) projector system, the invention is applicable not only to an apparatus which performs projection but also to a display apparatus with a display screen which a user directly views.

Such a direct-view-type display apparatus as described is applicable to visual recognition for two display apparatuses arranged in parallel, which is equivalent to FIG. 3B.

Figure 11:
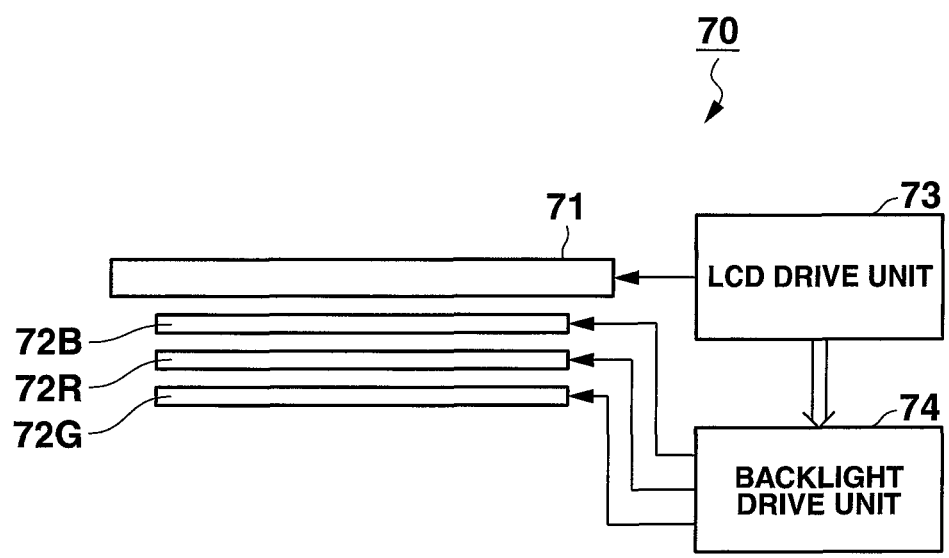
FIG. 11 shows an example configuration of a display apparatus according to another embodiment of the invention.

FIG. 11 shows a configuration applied to, for example, a field-sequential-type (color-sequential-type) liquid-crystal panel display 70 as a display apparatus.

In the figure, reference sign 71 denotes a phototransmissive monochrome liquid-crystal panel.

In addition, seat-type backlight units 72B, 72R, and 72G are arranged and layered on the lower surface side of the monochrome liquid-crystal panel 71.

The backlight units 72B, 72R, and 72G respectively form units in which light emitting diodes (LED) which emit B (blue) light, R (red) light, and G (green) light are arranged in line on four sides of a rectangular light-guide diffusion plate. More accurately, the units 72B, 72R, and 72G form sidelight-type units.

Primary-color light of area light emission emitted by a unit on the side of a lower layer which is more distant from the monochrome liquid-crystal panel 71 penetrates units on the side of an upper layer, and is irradiated onto the monochrome liquid-crystal panel 71 from the lower surface side thereof. Synchronized with this timing, an optical image which matches the primary-color light is formed by an image of a corresponding primary-color light component, the image displayed by the monochrome liquid-crystal panel 71.

The primary color light emitted from the backlight units 72B, 72R, and 72G has luminance (brightness) components which are in the increasing order of, for example, B<R<G. By emitting primary color light having a greater luminance component from a lower layer, a color balance when an optical image of a primary color is formed by the monochrome liquid-crystal panel 71 is adjusted in consideration of a light amount which damps (decreases) when the light penetrates any intermediate unit.

A LCD drive unit 73 performs display of an image through the monochrome liquid-crystal panel 71.

The LCD drive unit 73 further outputs a timing signal synchronized with the timing of a primary color image to be displayed by the monochrome liquid crystal panel 71 and a control signal which gives an instruction about a light emission amount to the backlight drive unit 74.

According to the timing signal and control signal from the LCD drive unit 73, the backlight drive unit 74 makes the backlight units 72B, 72R, and 72G drive and emit area light cyclically in a time-divisional manner.

For example, if one frame of a color image is configured by three fields of R, G, and B, the LCD drive unit 73 drives the monochrome liquid crystal panel 71, for example, at a frame rate of 120 frames/second to display images of primary colors at a speed of 360 fields/second. In this manner, the user of the liquid-crystal panel display 70 can visually recognize the monochrome liquid-crystal panel 71 from the up side, and can thereby watch a color image without a feel of discomfort.

Even in the liquid-crystal panel display 70 of a type in which the monochrome liquid-crystal panel 71 as a display screen is directly viewed, the synchronization signal for 3D display can be substituted by simultaneously turning on the backlight units 72B, 72R, and 72G in a very short time and by controlling gradations so as to make all pixels of the monochrome liquid-crystal panel 71 be fully phototransmissive and to emit white light as mixture of colors.

Needless to say, even this direct-view-type display apparatus is applicable to, for example, a display system which time-divisionally displays different images without using parallax.

Further, the invention is not only limited to the liquid-crystal panel display of the field-sequential (color-sequential) system whose structure is exemplarily shown in FIG. 11 but also applicable to a display apparatus using another light sources, such as a liquid crystal projector, a plasma display, or a monitor apparatus of a SED rear projector type.

Further, the invention is not limited to the embodiment described above but can be variously modified in practical phases without deviating from the subject manners of the invention.

In addition, functions performed by the embodiment described above may be combined as appropriately as possible, and may be performed.

The embodiment described above further includes various stages, and various inventions can be derived by appropriate combination of a plurality of disclosed components.

For example, even if several components are removed from all the components disclosed in the embodiment, the configuration from which the several components are removed may be extracted as an invention, insofar as effects of the invention are achieved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display apparatus having a switching-display function to switch and display left- and right-eye images, comprising:
a switch configured to execute at least one of setting of a master apparatus which displays a switching-display synchronization signal superposed on a display image and setting of a slave apparatus which does not display the switching-display synchronization signal;

a processor which executes a program stored in a program memory to superpose the switching-display synchronization signal, the switching-display synchronization signal being a specific color image displayed in a predetermined time period, on the display image, when setting of the master apparatus is executed by the switch; and a display configured to display the image on which the switching-display synchronization signal is superposed.

2. The display apparatus according to claim 1, wherein the processor performs control to inhibit superposition of the switching-display synchronization signal onto the display image, when setting of the slave apparatus is executed by the switch.

3. The display apparatus according to claim 1, wherein the processor performs control to:
    obtain, by a sensor, the switching-display synchronization signal superposed on the image which the master apparatus displays; and
    synchronize time control for switching display of the image displayed by the display with control which the master apparatus performs for the switching display, based on the obtained switching-display synchronization signal, when setting of the slave apparatus is executed by the switch.

4. The display apparatus according to claim 1, wherein the processor performs control to superpose a dummy signal having a different phase in place of superposing the switching-display synchronization signal onto display image, when setting of the slave apparatus is executed by the switch.

5. The display apparatus according to claim 4, wherein the processor performs control to superpose the dummy signal which has luminous energy substantially equal to the switching-display synchronization signal.

6. The display apparatus according to claim 4, wherein the processor performs control to superpose the dummy signal in case of multiple screen display in which display by the display apparatus is performed on each of multiple screens arranged adjacent to one another.

7. A projection apparatus comprising:
    a display apparatus having a switching-display function to switch and display left- and right-eye images, comprising:
        a switch configured to execute at least one of setting of a master apparatus which displays a switching-display synchronization signal superposed on a display image and setting of a slave apparatus which does not display the switching-display synchronization signal;
        a processor which executes a program stored in a program memory to superpose the switching-display synchronization signal, the switching-display synchronization signal being a specific color image displayed in a predetermined time period, on the display image, when setting of the master apparatus is executed by the switch, and
        a display configured to display the image on which the switching-display synchronization signal is superposed; and
    a projection optical system configured to form and emit an optical image from the image displayed by the display.

8. The projection apparatus according to claim 7, further comprising sensor configured to obtain the switching-display synchronization signal superposed on the image which the master apparatus displays, wherein:
    the sensor is configured to obtain the switching-display synchronization signal from luminous intensity of the projected image, and
    the the processor performs control to synchronize time control for switching display of the image displayed by the display with control which the master apparatus performs for the switching display, based on the switching-display synchronization signal obtained by the sensor.

9. The projection apparatus according to claim 8, wherein the sensor comprises a first sensor having light sensing properties equivalent to light sensing properties of a second sensor comprised by a display assist apparatus which receives the synchronization signal.

10. The projection apparatus according to claim 7, wherein the sensor is externally attached to a body of the projection apparatus.

11. The projection apparatus according to claim 7, further comprising:
    a light sensor configured to receive light of the switching-display synchronization signal superposed on the image which the master apparatus displays;
    wherein the processor performs control to suspend the light sensor when setting of the master apparatus is executed by the switch.

12. The projection apparatus according to claim 7, further comprising:
    a light sensor configured to receive light of the switching-display synchronization signal superposed on the image which the master apparatus displays;
    wherein the processor performs control to invalidate light receiving information obtained by the light sensor when setting of the master apparatus is executed by the switch.

13. A display assist apparatus configured to cooperate with a display apparatus having a switching-display function to switch and display left- and right-eye images, comprising:
    a light sensor configured to receive display light from a display image; and
    a processor which executes a program stored on a memory to:
    determine whether the display light received by the light sensor includes a switching-display synchronization signal or not; and
    perform a switch shutter operation for images to be switched and displayed, based on the synchronization signal, when the switching-display synchronization signal is determined to be included,
    wherein the switching-display synchronization signal is a specific color image displayed in a predetermined time period, on the display image.

14. The display assist apparatus according to claim 13, wherein the the processor performs control to perform a shutter operation to shut images at a timing of receiving the switching-display synchronization signal when a plurality of display apparatuses are used to respectively display images as targets to be displayed.

15. The display assist apparatus according to claim 13, wherein the processor performs control to suspend the light sensor during a period which is determined as not including the switching-display synchronization signal.

16. The display assist apparatus according to claim 13, wherein the processor performs control to invalidate display light received by the light sensor during a period which is determined as not including the switching-display synchronization signal.

17. The display assist apparatus according to claim 13, wherein the wherein the processor performs control to determine whether the display light includes the switching-display synchronization signal or not, based on an interval of signals which are continuously received by the light sensor and have luminous energy not smaller than predetermined luminous energy.

18. The display assist apparatus according to claim 17, wherein the interval of signals include a waveform of a signal received by the light sensor.

19. A system comprising:
   a display apparatus having a switching-display function to switch and display left- and right-eye images; and
   a display assist apparatus configured to cooperate with the display apparatus,
   the display apparatus comprising:
      a switch configured to execute at least one of setting of a master apparatus which displays a switching-display synchronization signal superposed on a display image and setting of a slave apparatus which does not display the switching-display synchronization signal,
      a first processor which executes a first program stored on a first memory to superpose the switching-display synchronization signal, the switching-display synchronization signal being a specific color image displayed in a predetermined time period, on the display image, when setting of the master apparatus is executed by the switch, and
      a display configured to display the image on which the switching-display synchronization signal is superposed,
   the display assist apparatus comprising:
      a light sensor configured to receive a display control signal superposed on the display image, and
      a second processor which executes a second program stored on a second memory to:
      determine whether the display control signal received by the light sensor is the switching-display synchronization signal or not, and
      perform a switch shutter operation for images switched and displayed, based on the switching-display synchronization signal.

* * * * *